United States Patent Office.

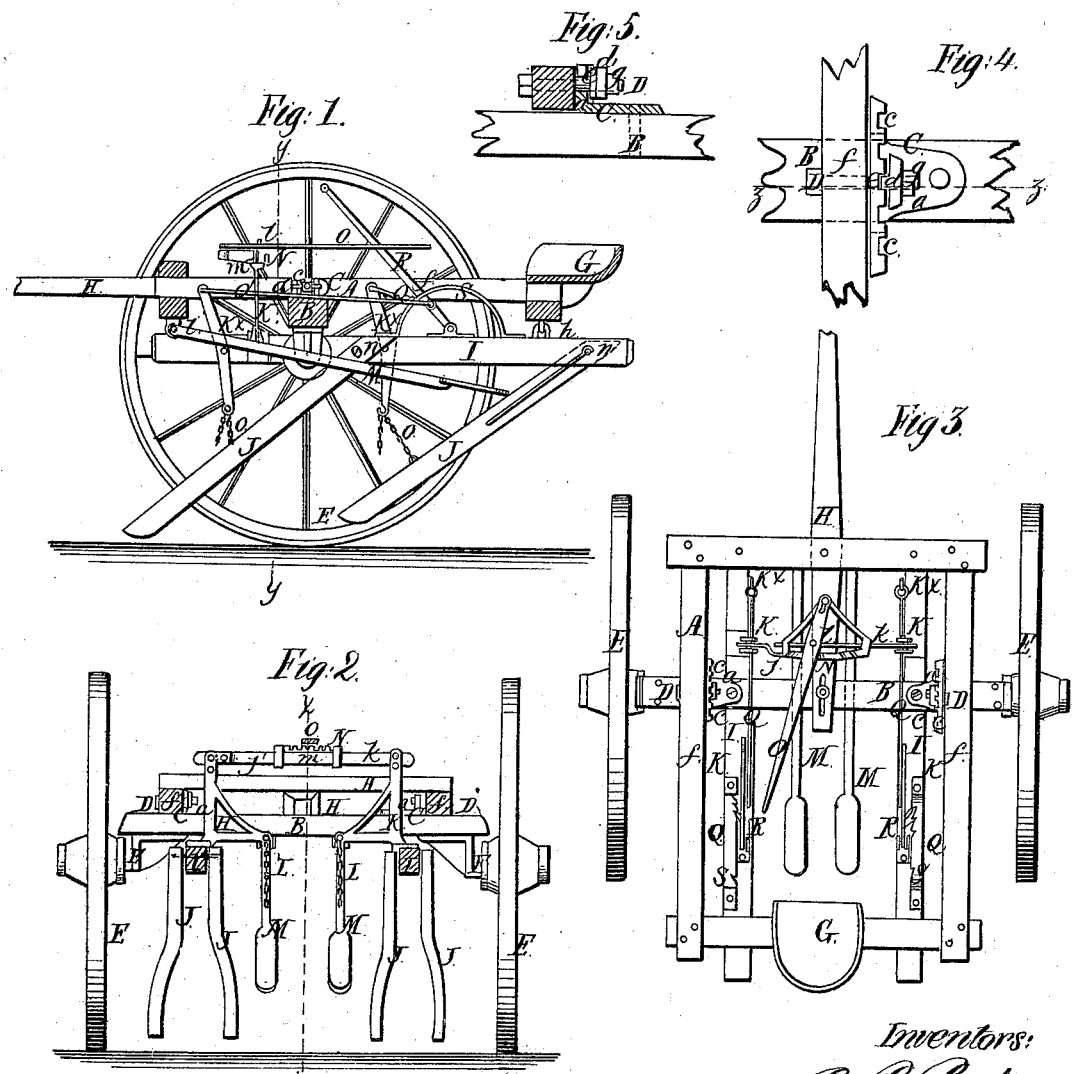

R. B. PARKS AND J. R. PARKS, OF NEPONSET, ILLINOIS.

*Letters Patent No. 91,661, dated June 22, 1869.*

IMPROVEMENT IN CULTIVATORS.

The Schedule referred to in these Letters Patent and making part of the same.

*To all whom it may concern:*

Be it known that we, R. B. PARKS and J. R. PARKS, of Neponset, in the county of Bureau, and State of Illinois, have invented a new and improved Cultivator; and we do hereby declare that the following is a full, clear, and exact description thereof, which will enable those skilled in the art to make and use the same, reference being had to the accompanying drawings, forming part of this specification.

This invention relates to a new and improved cultivator, designed for cultivating crops grown in hills or drills; and It consists in a peculiar construction and arrangement of parts, as hereinafter shown and described, whereby several advantages are obtained, which will be set forth in the following description.

In the accompanying sheet of drawings—

Figure 1 is a side sectional view of our invention, taken in the line $x\,x$, fig. 2.

Figure 2, a transverse section of the same, taken in the line $y\,y$, fig. 1.

Figure 3, a plan or top view of the same.

Figure 4, an enlarged plan or top view of a portion of the same.

Figure 5, a section of fig. 4, taken in the line $z\,z$.

Similar letters of reference indicate corresponding parts.

A represents a rectangular frame, which is secured to an axle-bar, B, by means of clamps C, composed each of an angle-plate, $a$, having an oblong slot, $b$, through it, with notches $c$ all around, to receive a washer, $d$, provided with a lip, $e$, a bolt, D, passing through the side-piece $f$ and washer $d$, with a nut, $g$, on the inner ene of the bolt, at the outer side of the washer, as shown more particularly in figs. 4 and 5.

The angle-plates $a$ are firmly secured to the axle-bar B, by bolts or otherwise, and it will be seen, that by loosening the nuts $g$, the frame A may be adjusted further forward or backward, as may be required, in order to obtain a perfect balance.

E E are wheels, which are placed loosely on separate or independent arms F, firmly bolted to the ends of the axle-bar B; and G is the driver's seat, secured on the rear part of the frame A, the draught-pole H being secured to the front end.

I I represent two beams, which are suspended to the front and rear ends of the frame A by joints $h$, so constructed or arranged that the beams may swing laterally.

To these beams I I, the plow-standards J are attached, two to each, and at opposite sides of the beams.

These standards are curved, (see fig. 2,) so that the shares of the two standards of each beam will be at a requisite distance apart.

To each beam I, on the front part, there is attached a right-angular, or L-shaped lever, K, the lower arms of which are connected, by chains L, to treadles M M, the front ends of said treadles being connected by joints $i$ to the front part of frame A. (See fig. 1.)

The upper arms of the levers K K are connected by bars $j\,k$, one of which, $j$, has a sector-rack, N, secured to its inner end, with a lever, O, attached, said lever being connected with the other bar $k$, as shown at $l$, and having a pendent lip, $m$, at its under side, to catch into the rack N at any desired point.

By this arrangement, it will be seen, that by adjusting the lever O, the shares of the standards attached to the two beams may be set at a greater or less distance from the plants, as desired, and at any time when the machine is in motion or at work.

The standards J are secured to the beams I I by means of pivots $n$, which admit of the standards being freely raised and lowered, the standards being connected by chains $o$ to the lower ends of levers K$^\times$, which are secured to the beams.

The upper ends of these levers K$^\times$ are connected, by rods Q, to upright levers R, at the rear parts of the beams I I, and these levers R, by means of semicircular racks S, may be secured at any point within the scope of their movement.

This arrangement admits of the shares being adjusted higher or lower, as desired, and also of being raised entirely above the ground, when desired, without the necessity of raising the beams.

It will be seen, that by vibrating the beams I, either or both of them, the shares may be made to conform to the sinuosities of the rows of plants, and either or both of the beams may be elevated more or less, as required, to make the shares conform to the inequalities of surface over which they may pass.

This machine, as a whole, is extremely simple and efficient, and may be readily managed by the driver, for working either on level or undulating land.

We claim as new, and desire to secure by Letters Patent—

1. The suspended beams I I, with plow, or share-standards J attached, in combination with the levers K, connected by the rack N and lever O, all arranged and combined to operate in the manner substantially as and for the purpose set forth.

2. Securing the frame A to the axle-bar B, by means of the clamps C, constructed and arranged as shown, so as to admit of the ready adjustment of the frame A, in a more forward or backward direction, as may be required.

3. The sector-rack N and lever O, in combination with a cultivator, substantially as and for the purposes described.

The above specification of our invention signed by us, this 28th day of September, 1868.

R. B. PARKS.
J. R. PARKS.

Witnesses:
  B. B. RICE,
  L. R. WINN.